US006658377B1

United States Patent
Anward et al.

(10) Patent No.: US 6,658,377 B1
(45) Date of Patent: Dec. 2, 2003

(54) METHOD AND SYSTEM FOR TEXT ANALYSIS BASED ON THE TAGGING, PROCESSING, AND/OR REFORMATTING OF THE INPUT TEXT (75) Inventors: Jan Anward, Stockholm (SE); Christianne Pang, San Francisco, CA (US); Marcus Jonsson, Sausalito, CA (US); Jan Samzelius, San Francisco, CA (US)

(73) Assignee: Perspectus, Inc., San Francisco, CA (US)

( * ) Notice: Subject to any disclaimer, the term of this patent is extended or adjusted under 35 U.S.C. 154(b) by 0 days.

(21) Appl. No.: 09/593,731

(22) Filed: Jun. 13, 2000

(51) Int. Cl.[7] .............................................. G06F 17/27
(52) U.S. Cl. ............................................................ 704/9
(58) Field of Search ................... 704/9, 10, 1; 707/530, 707/531, 532, 533

(56) References Cited

U.S. PATENT DOCUMENTS 4,965,763 A  * 10/1990 Zamora ........................ 704/1
5,708,825 A  *  1/1998 Sotomayor ................... 704/9
5,878,398 A  *  3/1999 Tokuda et al. ................ 705/8
5,893,075 A  *  4/1999 Plainfield et al. ........... 705/14
6,055,494 A  *  4/2000 Friedman ..................... 704/9
6,138,088 A  * 10/2000 Goeser ........................ 704/9
6,289,304 B1 *  9/2001 Grefenstette ................. 704/9

OTHER PUBLICATIONS

Friedman, et al.: "Natural Language Processing in an Operational Clinical Informaiton System", Natural Language Engineering, vol. 1, No. 1, pp. 83–108 (Mar. 7, 1995).*

* cited by examiner

Primary Examiner—Patrick N. Edouard
(74) Attorney, Agent, or Firm—Dergosits & Noah LLP (57) ABSTRACT

A method and system are provided for text analysis. A computer is used to analyze, parse, and manipulate natural language text according to a series of specific steps. Text is decomposed into small, homogenous segments that can be readily correlated to one another, to quantitative data, or to a knowledge database. The segments generated at the completion of the text analysis can then be further processed, for example, by a computer to derive statistical information, to generate a report, or to build a knowledge database.

18 Claims, 1 Drawing Sheet

METHOD AND SYSTEM FOR TEXT ANALYSIS BASED ON THE TAGGING, PROCESSING, AND/OR REFORMATTING OF THE INPUT TEXT

BACKGROUND OF THE INVENTION

1. Field of the Invention

The present invention relates generally to a computer-implemented method and system of text analysis for enabling automated text processing.

2. Description of Related Art

In their pursuit of greater efficiency and profitability, businesses are increasingly replacing manual systems with computer technology and automated systems. Improvements in text processing technology and the development of electronic networks such as the Internet now readily permit spoken, handwritten, and scanned text to be recognized, processed, and stored as computer-accessible data. In view of the high cost of manually processing from the content of such text, it is desirable to use computer technology to automatically derive knowledge therefrom. However, the nearly infinite variety of written and spoken text has proved to be an obstacle to the development of automated systems for analyzing content and deriving information from text.

Prior art technologies for automated text analysis can generally be categorized as "upstream technologies" that address the complexities of language (such as linguistics and natural language processing.), and "downstream technologies" that are directed to enabling computers to handle knowledge (such as machine understanding and artificial intelligence). These different technologies are usually applied in isolation from each other. This isolation has inhibited the overall potential for automated text analysis.

The prior art language and text analysis systems typically include a database module and a processing module. The database module contains definitions and/or semantic information corresponding to individual words. The processing module customarily performs a variety of processes upon the language or text to provide a simplified representation of the text that can be processed by a computer. Language or text analysis systems of this type are used by search engines and other information retrieval systems.

Certain prior art processing modules provide each word with a semantic tag and are therefore referred to as "taggers". Processing modules can also be used to decompose a stream of text into individual sentences, fragments, and words. These individual words are sometimes referred to as "tokens," and this analysis step is referred to as "tokenization". Following tokenization, the stream of text can be subjected to further semantic or linguistic processing such as identification of basic units of grammar, subdivision into corresponding fragments, and application of higher level algorithms.

The prior art language and text analysis systems are subject to several known disadvantages. Some prior systems require symbolic representations of the words and/or tokens. Many prior systems are characterized by excessive and unnecessary levels of processing. Furthermore, to analyze text, many prior art systems require an understanding of the precise meaning of the language or text.

The prior art language and text analysis systems cannot readily be configured to automatically determine such information as the relevance, weight or quantification of language or text. In particular, the prior art systems are not effective in deriving such information in correlation with the underlying purpose of the text. Such a system would be particularly suitable and advantageous in automatically processing data acquired in response to a particular inquiry, such as survey results.

It would be an advantage to provide a method and system for automatically analyzing text. It would be a further advantage if such method and system were available to automatically convert text into a format that could be further automatically processed to derive information regarding text content.

SUMMARY AND OBJECTS OF THE INVENTION

The invention is a method and system for text analysis. In the invention, a computer is used to analyze, parse, and manipulate natural language text according to a series of specific steps. Text is decomposed into small, homogenous segments that can be readily correlated to one another, to quantitative data, or to a knowledge database. The invention thereby enables the automated processing, analysis, and comparison of differing text streams to derive information and conclusions therefrom, and/or to build new or add to existing knowledge databases.

In the preferred embodiment of the present invention, the words of an input text are labeled with semantic tags. In one embodiment, the input text is acquired from a response to one or more input requests or prompts, such as survey. A series of operations are then performed on the semantically labeled input text. These operations can include splitting text, translating idioms, combining text, editing word tags, deleting unnecessary or superfluous words, identifying phrases or combinations, and rearranging expressions.

Text fragments are portions of the input text that are obtained as an output of any intermediate step of the present invention. The combination of words that is generated at the completion of the text analysis is a segment that can then be further processed, for example, by a computer to derive statistical information, to generate a report, or to build a knowledge database.

In another embodiment, the various operations to be performed upon the text portions comprise the steps of searching the text for particular combinations of words and/or tags, and changing the combination according to a corresponding prescription or rule. In yet another embodiment, the step of providing each word with a semantic tag can be accomplished using a commercially available tagging program, such as CLAWS, developed by the University of Lancaster, England.

In a further embodiment, a initial preparation step can be performed upon the roughly separable text portions; this initial step can be done prior to the other recited steps, such as the step of providing words with semantic tags. This initial preparation step may include spell-checking, character replacement, parsing the roughly separable text into smaller preliminary fragments and/or a variety of other cleaning operations. This step may have, as one purpose, the effect of formatting the stream of text to fit a set of proscribed parameters for a commercially available tagging program.

DETAILED DESCRIPTION OF THE INVENTION

The invention is a method and system for text analysis. In the invention, a computer is used to analyze, parse, and manipulate natural language text according to a series of specific steps. Text is decomposed into small, homogenous segments that can be readily correlated to one another, to quantitative data, or to a knowledge database. The invention thereby enables the automated processing, analysis, and comparison of differing text streams to derive information and conclusions therefrom, and/or to build new or add to existing knowledge databases. While the presently preferred embodiment of the invention is configured for use in analyzing English-language text, one of skill in the art will readily recognize that the teachings disclosed herein can be applied to any other language, text, or character-based system.

In the following description, for purposes of explanation, numerous specific details are set forth in order to provide an understanding of the present invention. It will be evident, however, to those of ordinary skill in the art that the present invention can be practiced without the specific details. In other instances, well-known structures and devices are shown in block diagram form to facilitate explanation. The description of preferred embodiments is not intended to limit the scope of the claims appended hereto.

For purposes of description, the term "input text" will be used to refer to any text that is to be analyzed according to the present invention. A "fragment" is a portion of the input text that is obtained as an output of any intermediate step in the method disclosed herein. A "segment" is the combination of words that is produced at the completion of the text analysis described herein. This segment can then be further processed, for example, by a computer to derive statistical information or to build a knowledge database. The use of these terms is for descriptive purposes only and is not intended in any way to limit the scope of the invention as claimed herein.

Figure 1:
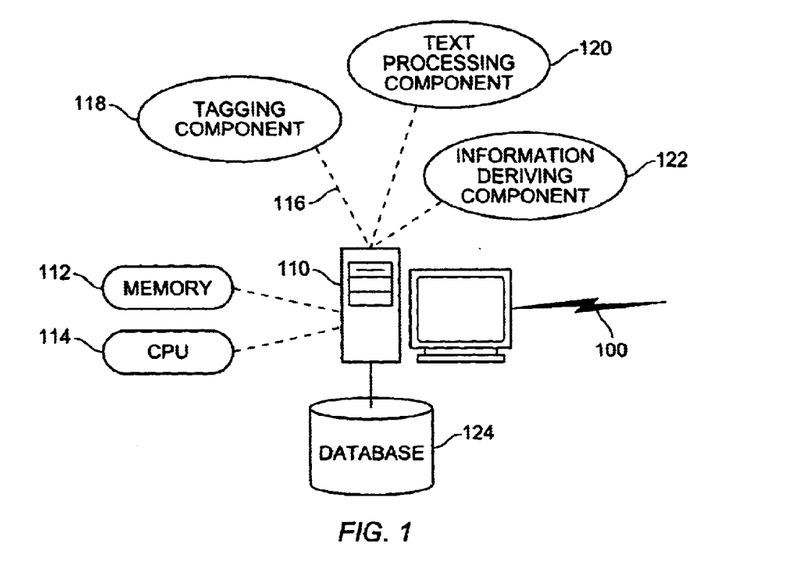
FIG. 1 is a block diagram illustrating a computer system for text analysis according to the present invention.

Any or all of the hardware configurations of the present invention can be implemented by one skilled in the art using well known hardware components. In the presently preferred embodiment, the present invention is implemented using a computer. Such computer can include but is not limited to a personal computer, network computer, network server computer, dumb terminal, personal digital assistant, work station, minicomputer, a mobile component such as a cell phone, and a mainframe computer, as well as one or more computers that are linked together in a network such as a local area network, or wide area network. The identification, search and/or comparison features of the present invention can be implemented as one or more software applications, software modules, firmware such as a programmable ROM or EEPROM, hardware such as an application-specific integrated circuit ("ASIC"), or any combination of the above. FIG. 1 is a block diagram illustrating a computer system for text analysis according to the present invention. In computer system 100, a computer 110 includes memory 112 and Central Processing Unit (CPU) 114 modules.

One or more software applications 116 accessible to the computer system are used to analyze text according to the present invention. Any or all of the software applications of the present invention can be implemented by one skilled in the art using well known programming techniques and commercially-available or proprietary software applications. The software applications can be implemented in any appropriate programming language using modules and libraries based on that language, and can also include any combination of interrelated applications, separate applications, software modules, plug-in components, intelligent agents, cookies, JavaBeans™, and Java™ applets. (Java and all Java-based marks are trademarks or registered trademarks of Sun Microsystems, Inc. in the United States and other countries.)

The software applications that comprise the present invention can be stored on any storage device accessible to the computer system, including but not limited to a hard drive, CD-ROM, DVD, magnetic tape, optical drive, programmable memory device, and Flash RAM. It will be readily apparent to one of skill in the art that the software applications can be stored on the same or different storage devices. For purposes of this description, the software application(s) according to the present invention will be referred to herein as the "text analysis software application." The use of the term text analysis software application is in no way intended to limit the scope of the invention as claimed herein.

In the presently preferred embodiment, the text analysis software application comprises a tagging component 118, a text processing component 120, and an information deriving component 122. While the preferred embodiment is described herein with respect to three components, one of skill in the art will readily appreciate that the text analysis method according to the invention can alternatively be performed using any other number of components. For example, the functionalities of any of the components can be combined with, or separated into, other components. The embodiment illustrated in FIG. 1 is preferred because this component arrangement facilitates component substitution in situations in which, for example, a different tagger or different type of information is desired.

The computer system can also include one or more databases 124 for storing information, including but not limited to text to be analyzed, information required to analyze the text, and the results of such text analysis according to the invention. As used herein, the term "database" refers to a collection of information stored on one or more storage devices accessible to the computer system and software application(s) associated therewith. The use of the term database is in no way intended to limit the scope of the present invention as claimed herein. The database according to the present invention can include one or more separate, interrelated, distributed, networked, hierarchical, relational and object-oriented databases. The database can be created and addressed using any well-known software applications such as the Oracle 8™ database. The database according to the present invention can be stored on any appropriate read/writeable storage device, including but not limited to a hard drive, CD-ROM, DVD, magnetic tape, optical drive, programmable memory device, and Flash RAM.

Figure 2:
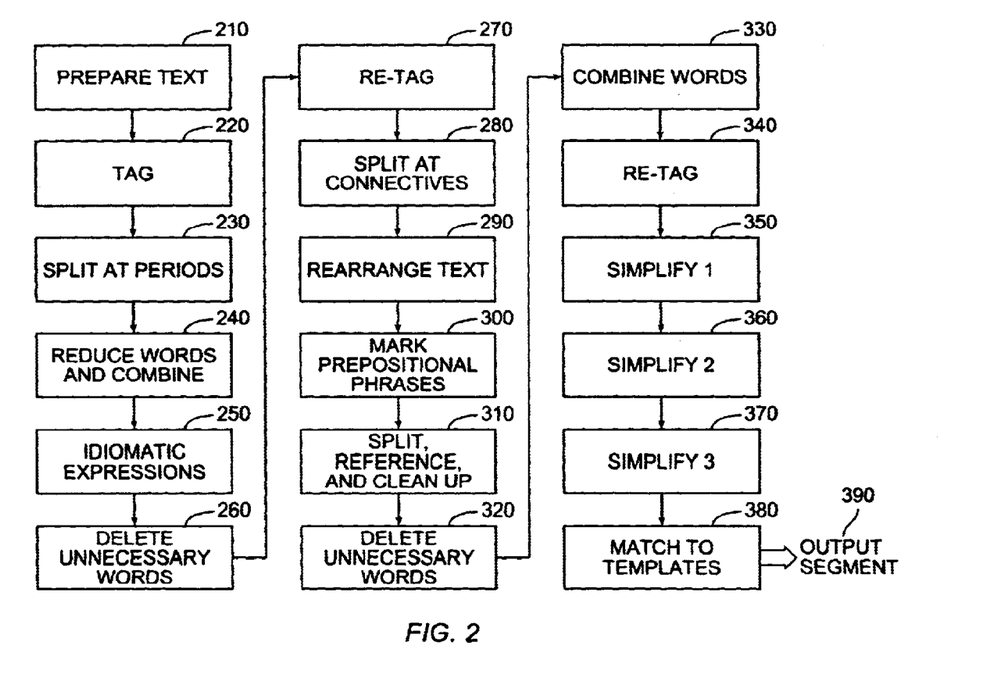
FIG. 2 is a process diagram illustrating the method for computerized text analysis, according to the present invention.

FIG. 2 is a process diagram illustrating the method for computerized text analysis, according to the present invention. Input text is first prepared 210, if necessary, to enable the text to be processed by the text analysis software application. This preparation can include such steps as checking spelling, adding or replacing punctuation marks, marking the ends of sentences and paragraphs, and conforming the spacing between words, sentences and paragraphs. The preparatory steps can be performed manually, automatically (for example by a computer), or by any combination thereof.

Table 1 lists exemplary preparation steps according to the preferred embodiment of the present invention. While, in the preferred embodiment, each preparatory step is applied to all input text, in alternative embodiments, it is not required that each step be performed for all text that is to be analyzed. The determination of which preparatory steps are to be performed can be made in response to particular text characteristics, such as the presence of specific types of punctuation or formatting. This determination can be automatic, for example, using an intelligent agent, or a macro, or can be performed manually.

TABLE 1

| | |
|---|---|
| 1. Manual spell-checking. | |
| 2. Ensure that each comment (complete open ended answer) ends with a paragraph mark rather than each sentence. | |
| 3. (P)-replace with <space> | :single pass |
| 4. "-replace with <space> | :single pass |
| 5. &-replace with and | :single pass |
| 6. ^P-replace with .^P | :single pass |
| 7. ..-replace with .<space> | :multiple pass |
| 8. <space>.-replace with .<space> | :multiple pass |
| 9. <space>,-replace with ,<space> | :multiple pass |
| 10. <space>!-replace with !<space> | :multiple pass |
| 11. <space>?-replace with ?<space> | :multiple pass |
| 12. <space>:-replace with :<space> | :multiple pass |
| 13. <space>;-replace with ;<space> | :multiple pass |
| 14. ..-replace with . | :multiple pass |
| 15. !!-replace with ! | :multiple pass |
| 16. ??-replace with ? | :multiple pass |
| 17. ,,-replace with , | :multiple pass |
| 18. ::-replace with : | :multiple pass |
| 19. ;;-replace with ; | :multiple pass |
| 20. <space><space>-replace with <space> | :multiple pass |
| 21. .<space> ^P-replace with .^P | :single pass |
| 22. .^P ?.^P-replace with .^P | :single pass |
| 23. .^P.-replace with .^P | :single pass |
| 24. .^P<space>-replace with .^P | :multiple pass |
| 25. .^P ^P-replace with .^P | :multiple pass |
| 26. .^Pno.^P-replace with .^P | :multiple pass |
| 27. !.^P-replace with !^P | :single pass |
| 28. ?.^P-replace with ?^P | :single pass |
| 29. ..-replace with. | :multiple pass |
| 30. <space><space>-replace with <space> | :multiple pass |

A tagging operation 220 is then performed by the tagging component on the prepared input text. Because later operations require tagged text, the tagging operation is preferably performed prior to any text processing operations. In this tagging operation, a word class tag is assigned to a word or group of words according to the type of word. A word class, for purposes of the present invention, refers to a category of syntactically identical words, including but not limited to nouns, infinitive verbs, present tense verbs, adjectives, dependent clauses. A software application, referred to herein as a "tagger", is preferably used to perform this tagging operation. The presently preferred embodiment of the subject invention uses the tagger CLAWS, developed by the University of Lancaster, England. However, in other embodiments, input text is tagged by an alternative tagger or manually tagged. Table 2 illustrates an exemplary tagging operation according to the present invention. In this example, the sentence:

"The movie was seen by her"

is syntactically tagged for word class and inflection using a tagger. For purposes of the present invention, inflection refers to endings added to words of a particular word class. For example, verbs are tagged according to their tense and mood (e.g present, past, imperative, infinitive or participle) and nouns are tagged according to their type (e.g. proper or common), their definiteness (e.g. definite or indefinite), and their number (e.g. singular or plural).

TABLE 2

| Comment or paragraph number | Word number | Word | Word tag |
|---|---|---|---|
| 1 | 10 | The | AT |
| 1 | 20 | movie | NN1 |
| 1 | 30 | was | VBZ |
| 1 | 40 | seen | VVN |
| 1 | 50 | by | II |
| 1 | 60 | her | PPHO1 |

A typical tagger uses resources such as a dictionary and a word sequence probability assessment to determine proper word class. For example, a tagger analyzing the phrase: "The book was a good read", first looks up all words of the phrase in the tagger dictionary. The dictionary definitions of both "book" and "read" should reflect that the usages of these words are ambiguous because both words can be either nouns or verbs. The tagger resolves such ambiguities by analyzing the words of the phrase that are either before or after the ambiguous word. In this example, the presence of "the" before "book" is an indicator that "book" is a noun. Similarly, the "a" before "read" indicates that "read" is also a noun. Some parsers, such as CLAWS, also provide a probability assessment of several choices if the tagger is unable to definitively determine a proper word class.

A tagger may have specific requirements for input and output file formats. Computer routines and/or manual formatting can be implemented to perform any formatting necessary for the tagging or subsequent steps according to the invention.

The preparation 210 and tagging 220 steps are performed only once and in the disclosed order. However, the subsequent steps of the method can each be performed more than one time. In addition, while the order of steps described herein is the preferred embodiment of the invention, in alternative embodiments, steps 230 through 380 are not required to be performed in any particular sequence.

Once the input text has been tagged, a text processing operation is performed. The text processing operation includes steps that are used to reformat the input text into intermediate fragments and, finally, to a text segment that can be automatically processed by a software operation with minimal human intervention. The text processing operation is preferably performed by a software application such as a specialized text analysis software application. The preferred embodiment of the present invention uses a proprietary text analysis software application However, in alternative embodiments, any or all of the steps of this operation can be performed by some other application, such as Microsoft Excel, or can be performed manually.

In the text processing operation, the tagged text is searched for particular combinations of words and/or tags, or particular sequences of words or tags within tagged text (known as the "condition"). Each such combination and condition has one or more associated actions to be performed by the text analysis software. When a string or condition is identified in the text fragment, the respective action is applied by the text analysis software application to reformat the text fragment. The reformatted text is then searched again for identified combinations or conditions and the respective action applied until no strings are identified.

In the presently preferred embodiment, the first condition/action rule 230 applied in the text processing step is operable to replace each period that is not part of an abbreviation with a marker for a split ("split marker"). In the exemplary tagger table format of Table 1, such split marker is placed in the Word and the Word Tag columns. The number of words in the text is then reduced 240 by actions including but not limited to:

1. Deleting, for example by deleting rhetorical expressions, deleting parentheses and their contents, and deleting questions.
2. Changing tags, for example in common expressions in which words are frequently mistagged.
3. Combining, for example by combining "number to/or number" or combining forms of "have to."

It is contemplated that in alternative embodiments of the present invention, additional actions can also be performed as appropriate to reduce the number of words in the text fragment.

Idiomatic expressions can be, by nature, difficult to semantically tag and process. The present invention takes this into account by providing at least one specific condition/action rule for each identified idiomatic expression 250. These idiomatic expression condition/action rules can be manually stored in a database accessible to the text analysis software application. For example, an idiomatic expression can have an associated rule that substitutes a standard-language equivalent expression for the idiom. The substituted equivalent expression can then be further processed according to the present invention.

Condition/action rules can be used to delete words and phrases that add little or no content to the text 260. For example, all articles except for "no" and "every", and unnecessary uses. of the word "it" may be deleted. In this step, condition/action rules can be used to convert passive phrases to active phrases. For example, a passive sentence, such that illustrated in Table 2 ("The movie was seen by her"), can be characterized by the string:

AT NN1 VBZ VVN "by" PPHO1

A rule can be associated with this string to require that such passive phrase be reformatted into the following string:

PPHS1 VVD AT NN1

As reformatted, the text is now the active sentence "She saw the movie." In this example, the objective pronoun, "her", tagged "PPHO1" is replaced with the corresponding subjective pronoun, "she". In accordance with the change from subjective to objective pronoun, the word (class) tag is changed to PPHSI. Similarly, the verbs are changed from "was seen", tagged "VBZ" and "VVN", to the past tense form "saw", with its correct word (class) tag "VVD". Any other appropriate actions can also be performed in alternative embodiments of the present invention to delete words and phrases that add little or no content to the text.

In many instances, the grammatically correct tag for a word does not actually match the meaning of the word. The tagger frequently emphasizes formal, inflectional criteria over the functional criteria that determine how words are actually used. As a result, certain words will have to be retagged with semantically more relevant word tags. Condition/action rules are provided to re-tag such words 270. For example:

Many verbs in the gerund form ("-ing") tend to behave as adjectives;
Many verbs in their participle form behave as adjectives;
Many prepositions behave as adverb particles and do not have a following prepositional phrase;
Abstract nouns, such as the word "existence" are identified by matching words of the fragment that are tagged as nouns against a list of abstract nouns. Identified abstract nouns are re-tagged as necessary. The list of abstract nouns is developed by identifying, in a large amount of textual material, all nouns following a compound preposition (such as "out of"). In the preferred embodiment, the proprietary text analysis software application is used to identify these nouns. However, in alternative embodiments, the nouns are identified using another proprietary or off-the-shelf software application, or by manual identification. Non-abstract nouns are then manually culled from the collection of identified nouns. The resulting set of nouns is the list of abstract nouns that is used in this retagging step.

Condition/action rules can also be used at this point to split the text at many connective words 280, including but not limited to:

And;
Or;
But;
So;
All commas;
All conjunctions; and
All prepositional conjunctions.

The text processing operation can be used to combine words in the text 290. Such combinations can include but are not limited to:

All adjacent nouns;
Combining with nouns:
  any expression of quantity, such as numbers, "no", "every", "all"; and
  related post-determiners, such as "little", "much";
All "'noun'-of-'noun'" terms;
Combining all verbs and adverb particles;
The verb "have" and its various forms, when followed by another verb in participle form; and
The verb "do" and its various forms, when followed by another verb in infinitive form.

Various forms of phrases beginning with "it is" or "it was" are rearranged in this text processing step. For example, the phrase "it was nice to see" is rearranged to the phrase "seeing was nice." Any other appropriate actions can also be performed in alternative embodiments of the present invention to combine words or to rearrange text according to step 290.

Prepositional phrases are then identified and marked by the text processing component 300. The text processing component of the text analysis software application is programmed with at least one rule that is operable to identify the beginning and end of a prepositional phrase. In most cases, the beginning of the phrase is easily identified because most prepositional phrases begin with a preposition. The ending of such a phrase is more difficult to identify. For example, if a preposition is followed by a noun(s) and then a split marker or another preposition, then the first prepositional phrase ends after the noun(s). The text processing component is then used to insert markers in the text at the beginning and end of such phrases.

A transformation can then be performed on the text in response to the nature of the preposition or the content of the prepositional phrase. Prepositional phrases that include a verb and are therefore considered to be complete fragments are split from the text. Such transformations can include but are not limited to:

If a noun precedes the preposition and the phrase content is simple (e.g. only a noun), combining the two nouns and deleting the preposition. For example, the phrase "the man in Sweden" is transformed to "Sweden-man";
If a prepositional phrase includes a verb, fragment markers are inserted before and after the phrase to make the phrase into a fragment;

Combining remaining prepositional phrases with preceding verbs or subsequent noun(s); and In certain cases, such as when the prepositional phrase is adding information to the fragment and is not the core information of the fragment, constructing new fragments to "house" the prepositional phrase. For example, "I was crying in the bathroom" is transformed to "I was crying" and "I was in the bathroom."

Condition/action rules are then applied to further split 310 the text fragment such that:

Fragments with multiple main verbs are primarily:
Split before the first finite verb that follows the first verb of the fragment;

Split before the first verb after a lexical verb. A lexical verb is a verb that always has meaning in and of itself, as distinguished from such verbs as "have", "do", "be", and modal verbs such as "could" and "would";

A fragment with referencing words that originate as question words, including but not limited to such words as who, what, where, which, whose, whom, why, and how is treated as follows: The fragment is split on all such words except for "who" and "which" (which are expressions of ownership that are combined in step 290);

An obvious referent of a word in the fragment is copied over. For example, "the mailman, who came yesterday . . . ", is simplified to "the mailman came yesterday";

When a word does not have an obvious referent, a wildcard referent is inserted. For example, "The phone was where I knew it was" is transformed to "The phone was PLACEXXX" and "I knew PLACEXXX."

Residual referencing is also incorporated into the splits described with respect to step 310. In this residual referencing procedure, words that reference a group of animate or inanimate objects and that are frequently followed by the definition of the group, such as "everyone," "everything," and "all" are split and referenced. Because each such group is considered to be unique, each group is given a wildcard reference. For example, "All I know is basic grammar" is split and referenced to "I know ALLXXX" and "ALLXXX is basic grammar."

A clean up procedure is also performed as a part of step 310. In this cleanup procedure, instances of multiple references are split. For example, "it was exactly where I knew it should be" is split into three fragments using any other rules described herein. According to the rules previously discussed, multiple verbs result in one split and the word "where" results in another split:

It was exactly placeXXX.

I knew placeXXX.

It should be placeXXX.

In alternative embodiments of the present invention, any other appropriate condition/action rules can be applied to further split, reference, and clean up the text fragment according to step 310.

In a next test processing step 320, the condition/action rules applied in step 260 are again applied to the fragments. At this point, some redundant verbs are also eliminated from the fragments, such as:

Any residual forms of the verb "have" that precede another verb that is in participle form; and Any residual forms of the verb "be" that precede another verb in its -ing form.

A further combining step 330 is performed on the fragments. In this combining step, verbs and any "orphaned" prepositions (prepositions that no longer have any words following "the" and are immediately succeeded by a fragment marker) following the verb are combined, as are any remaining pairs of lexical or finite verbs. Finite verbs are any verbs that are not in the infinitive form, i.e. "has" is finite, but "to have" is infinite.

Semantic tags on words that act as amplifiers, such as "so" in "he is so strong" or "very" in "he was very friendly" are changed in a re-tagging step 340. In addition, consecutive amplifiers are combined with one another. An amplifier is identified by comparing a word to a list of previously identified amplifiers and by determining whether the word immediately precedes an adjective or adverb.

At this stage in the text processing, three steps 350, 360, 370 are performed to further simplify the structure of each text fragment. Certain elements are moved 350 into tags for each fragment as a whole. The elements moved into tags for each fragment include but are not limited to:

Modal verbs, such as "would" or "could":
If a modal verb and another verb are in the fragment, the modal verb is moved into the fragment tag. Modal verbs are identified by the tagger software.

Mental/verbal verbs, such as "feel" or "think" or "say":
If a mental/verbal verb and another verb are in the fragment, the mental/verbal verb is moved into the fragment tag. Mental/verbal verbs are identified by matching verbs against a list of such verbs. This list can be compiled in various ways and from various sources, including but not limited to:

The mental/verbal verbs identified in Quirk, Greenbaum, Leech, and Svartvik, "A comprehensive grammar of the English language," Longman, (London 1985).

The identification of all instances of the string "pronoun verb 'that'" from a large amount of textual material. Such instances can be identified by any suitable method such as by using the proprietary text analysis software application. In general, most English verbs that appear in such a string are mental/verbal verbs.

The identification of all instances in which the string "pronoun verb" appears in only one segment and in which the following segment begins with the string "'noun or pronoun' and the verb 'be' and its various forms". In this case, the verb in the first segment is usually a mental/verbal verb.

Negation:
Any term of negation, such as "not" is moved into a fragment tag, unless the term of negation immediately precedes an adjective or an adverb. A term of negation that immediately precedes an adjective or adverb will be considered to be an amplifier and have already been re-tagged accordingly, as described above with respect to amplifiers.

Frequency terms, such as "often".

Time:
It is preferable for all fragments to have an associated "clockstamp". This is accomplished by moving any time information contained in a fragment into a fragment tag. Time information words are identified in any suitable way, including, but not limited to:

All time adverbs, except "then", because "then" frequently has a logical meaning, rather than a sequential meaning, for example, "if . . . then". These time adverbs are identified using the tagger.

All time wildcards. Time wildcards are analogous to the place wildcards, discussed previously. Wildcards, such as place and time wildcards, are used to replace the original word when the original word is referring to some other place or time, such as "where" and "when". For example, the word "when" can cause the wildcard "timeXXX" to be inserted. Place and time wildcards are also used when the original word is an expression of a place or time relative to another place or time. For example, "John had lunch and then he had coffee" is transformed, in this step, to "John had lunch timeXXX" and "John had coffee timeYYY", where YYY is after XXX.

All time nouns (identified by the semantic tagger in step A).

Other time nouns or expressions. Instances of noun/verb combinations that are frequently followed by a time noun or expression are identified from a large amount of textual material. This identification is preferably accomplished using the proprietary text analysis software application, but can alternatively be accomplished using other software applications, such as Microsoft Excel, or manually. After a collection of noun/verb combinations has been identified, the textual material is searched again to determine the word(s) following such combinations. The combinations and following words are then manually reviewed to isolate the time nouns and expressions.

Place:

Expressions relating to geographical location or place are treated in a similar manner as time expressions. Thus, the following items are moved into fragment tags:

All place wildcards.

All locational (PLACE-RELATED) nouns (identified by the semantic tagger in step 220).

All locational adverbs, other than "there", which first needs to be deleted and substituted by the word it is referencing, also identified by the tagger.

Aspectual verbs, when followed by another verb. Aspectual verbs are verbs that are related to the starting, stopping or continuing of an action, such as "kept" or "went". Aspectual verbs are identified by matching words tagged as verbs against a list of aspectual verbs. The preferred source for aspectual verbs on this list is Quirk, Greenbaum, Leech, and Svartvik, "A comprehensive grammar of the English language," Longman, (London 1985).

Any other appropriate elements can be moved into the tags as desired in alternative embodiments of the present invention.

In a second simplification step 360, the order of words in a fragment are rearranged such that the segments produced as output text of the text analysis according to the invention are in the grammatical order "subject-predicate-adjective" or "subject-predicate-object." Split verbs that actually belong together are also rearranged in this step, such as expressions with "have", a noun and then another verb (in past tense). For example, the fragment "I had a tooth removed" is altered to "I had removed a tooth". For example, the following types of word order are rearranged:

Fragments lacking a true subject and in which object comes first, such as "he was invoiced" [actually meaning "somebody invoiced him"].

Fragments beginning with "it was" and followed by the object, such as in "it was trouble he heard", [actually meaning "he heard trouble"].

Fragments in which the adjective is first: "attractive she was" [actually meaning "she was attractive"]

Fragments with the verb "have" or its various forms, followed by a possessive pronoun and a noun. For example, the fragment "phone had its receiver pulled-off", which means that someone had pulled the receiver off the phone, would in this step be reversed and combined into "phone-receiver pulled-off."

In the third simplification step 370, the number of words that are used to reference previously-mentioned entities, times, or places is manipulated using condition/action rules. The performance of the condition/action rules of this third simplification step is contingent upon a context test that is used to eliminate instances of non-sensical noun-verb verb pairs, such as "cow shopping." This context test is constructed by identifying all "noun-verb" combinations and their related tags in a large amount of textual material. A probability analysis is then performed on the identified combinations for the appearance of "word/word" combinations as well as "word/tag", "tag/word" and "tag/tag" combinations. Condition/action rules for this third simplification step can include but are not limited to:

Pronouns:

"I", "me", "we", "us" and "you" remain unchanged.

"He", "she", "him" and "her" are replaced by preceding "animate" singular nouns that refer to the particular living entity, such as a person or an animal.

"It" is replaced with a preceding inanimate singular noun that refers to an inanimate object, such as a door or a house.

"They" and "them" are replaced with a preceding plural noun.

Determiners, such as "this", "that", "these", and "those" are replaced with preceding nouns of proper number.

"Then" is replaced with a preceding "clockstamp" and one unit of time is added to the clockstamp.

". . . it did", as in "he said the tree would burn and it did" is replaced with the subject and the predicate of the preceding fragment, in this example, "tree would burn."

Splits caused by connectives, such as "and" and "or" such as "Joe liked Billy and Bob" are rearranged in step 280 so that the fragment becomes "Joe liked Billy" split-marker ("and") "Bob". In step 370, the subject and the predicate from the previous fragment are copied over and a pair of parallel fragments are created: "Joe liked Billy" splitmarker ("and") "Joe liked Bob." The quantities associated with degree adverbs, such as "more" and "less" are manipulated. For example, given the fragments: "Joe had $100. Bob had more.", the latter fragment is changed to "Bob had>$ 100."

The condition/action rules previously described for connectives (step 280) become more complicated for connectives that contain contrasting words, such as "except" or "apart-from". Each such connective is manually identified and analyzed and one or more associated rules generated to reflect the exact logical relationship between the fragment preceding the connective and the subsequent fragment. The respective rule(s) is then applied to an identified connective to fit the logical relationship specified. For example, the fragment "I had no difficulty, except the noise" is converted to: "I had only one difficulty" and "difficulty was noise".

References for the word "same" are manipulated in a similar manner to those for degree adverbs such as "more," described above.

Pre-determiners, such as "both" are manipulated in a similar manner to those for degree adverbs such as "more," described above.

As a result of the text processing, objects may be missing from fragments at this stage. The verb in each fragment is checked against a list of verbs that require objects. For each such identified verb, the object in the preceding fragment is copied into the fragment. If no preceding object exists, the preceding subject is copied into the fragment. For example, the original phrase "John had the book I needed" would have previously been split, according to the present invention, into "John had the book" splitmarker "I needed". The verb "needed" in the second fragment has no independent meaning because it is not followed by an object or an infinitive marker "to". Therefore, the object from the preceding fragment is copied over to create the fragments "John had the book" splitmarker "I needed the book".

The list of the verbs that require objects is developed by identifying a large material of text fragments that end with a "verb noun" sequence in a large amount of textual material. This step is preferably performed using the proprietary text analysis software application according to the present invention but can also be performed using other applications, such as Excel, or manually. Given the typical structure of English sentences, the last noun is typically the object. This step produces a first list of candidate verbs. A large amount of textual material is then searched to identify instances of the verbs that are on the first list but are not followed by a noun in the same fragment. This step produces a second list of verbs that do not require an object. Thee verbs on the second list are then eliminated from the first list to create a third list. A pronoun is then placed in front of each verb in the third list and each "pronoun-verb" combination in the third list is manually reviewed to determine whether such a combination is permissible according to English grammar.

Adjective expressions such as "'as' adjective 'as'" can also require referencing during this third simplification step. For example, condition/action rules are used to convert "Joe was as tall as Bob" to "Joe was TALLXXX" and "Bob was TALLXXX," where TALLXXX is a wildcard. These condition/action rules are derived from a manual analysis of a large amount of textual material to determine the semantic behavior of particular adjective expressions. One or more associated rules is then generated to simplify each such expression.

Once a fragment has been simplified, it is matched against templates 380 to determine whether it has been completely resolved into a segment. The templates are designed to describe the types of words that can be in a segment according to the present invention as well as the permissible order for such words. For example:

"noun verb noun" phrases are typically actions or events. If the verb is a form of "to be," the segment describes a logical connection. A "noun verb noun" phrase is considered to be a fully resolved segment.

A fragment that does not match any of the templates is then manipulated by the text analysis software application to fully resolve the fragment into a segment. For example, words can be copied into the fragment from previous or subsequent fragments or segments such that the fragment matches a template. For example, at this stage in the method according to the present invention, a fragment may contain only a noun or only a preposition. For a fragment that contains only a noun, the first action performed is copying into the fragment the verb from the previous fragment. If this copied verb requires an object, the object is also copied into the fragment. For a fragment that contains only a preposition, the preposition is moved to the previous fragment and combined with the verb in that fragment. In this example, the preposition is behaving as an adverb particle.

Once a fully resolved segment has been generated 390 by the text analysis software application, the segment can readily be processed automatically using, for example, the information deriving of component of the text analysis software application, or any other software application. Thus, a market analysis software application can be used to analyze at least one segment, to perform statistical analysis thereupon, and to generate a report detailing the results of the analyses.

In one preferred. embodiment of the invention, each of steps 210 through 380 is performed one time and in the order described herein. However, in alternative embodiments, steps 210, 220, and 230 are performed one time only while any or all of steps 240 through 380 can be performed a plurality of times.

Table 3 illustrates yet another preferred embodiment of the invention. In this embodiment, Level 1 is required for operation of the invention, with all of the steps of Level 1 being performed sequentially. However, with the exception of Level 7, any or all of the other Levels in Table 3 can be performed in any order or omitted. Level 7 contains step 210 which, as has been described herein previously, is a preparatory step that must be performed prior to the tagging step 220 (in Level 1). The accuracy of the output of the creases as more Levels are performed.

Step 220 and 230 of Level 1 and Step 210 of Level 7 are performed one time only. However, any of the other steps 240 through 380 contained in Table 3 can be performed a plurality of times. The accuracy of the invention increases with the number of levels performed.

TABLE 3

|      | Level 1 | Level 2 | Level 3 | Level 4 | Level 5 | Level 6 | Level 7 |
|------|---------|---------|---------|---------|---------|---------|---------|
| Step | 220     | 370     | 250     | 240     | 320     | 340     | 210     |
|      | 230     |         |         | 260     |         |         |         |
|      | 270     |         |         |         |         |         |         |
|      | 260     |         |         |         |         |         |         |
|      | 290     |         |         |         |         |         |         |
|      | 300     |         |         |         |         |         |         |
|      | 310     |         |         |         |         |         |         |
|      | 330     |         |         |         |         |         |         |
|      | 350     |         |         |         |         |         |         |
|      | 360     |         |         |         |         |         |         |
|      | 380     |         |         |         |         |         |         |

Example 1 illustrates the automatic processing of a customer survey, according to the present invention.

EXAMPLE 1

A set of customer survey results that include open-ended text responses are processed according to the text analysis method of the present invention. The text analysis software application is used to resolve the open-ended responses to segments. For this set of results, all ratings on particular factors are converted, if necessary, to being expressed as deviations from the overall rating. For example, if the respondent assigned a rating of "7" for the entire experience, "8" is deducted from all other ratings. Thus, all ratings will be of the form +2, −1, +3, etc.

One or more subsets of respondents can then be selected according to a common event, emotion, or characteristic for which the amplifiers can differ. For example, a subset can be selected of respondents to a question regarding the friendliness of the customer service representative in which the respondents can use the amplifier "very." A regression analysis can be performed to determine the impact of the presence of each such amplifier. As an example, the regression analysis might determine that the amplifier "very" is operable to double a rating, e.g. from −1 to −2.

A regression analysis can then be performed on the segments, adjusting for the presence of the amplifiers. The types of segments and segment words that are associated with each rating factor can thereby be determined. The various regression analyses can be performed by any suitable method, including but not limited to manual, or a computer-implemented analysis using such software applications as the information deriving component according to the present invention. The present invention thereby permits an open-ended answer to be decomposed and rearranged, as required, into segments and each individual segment can be transformed into an effect on a particular factor's rating. A report detailing the results of the analyses can then be generated.

While the invention is described in conjunction with the preferred embodiments, this description is not intended in any way as a limitation to the scope of the invention. Modifications, changes, and variations which are apparent to those skilled in the art can be made in the arrangement, operation and details of construction of the invention disclosed herein without departing from the spirit and scope of the invention.

What is claimed is:

1. An article of manufacture embodying a program of instructions executable by a computer, the program of instructions comprising:
    tagging an input text;
    processing the tagged input text, comprising:
        (a) searching the tagged input text to identify at least one defined combination or condition, wherein each combination or condition is associated with at least one action, and
        (b) performing at least one action, which is associated with each identified combination or condition, to the input text;
    performing the text processing steps until the processed text matches a text template; and
    generating at least one homogeneous text segment.

2. The article of manufacture of claim 1, further comprising instructions for deriving information from the at least one text segment.

3. The article of manufacture of claim 2 further comprising instructions for generating a report from the derived information.

4. A computer-implemented method for analyzing input text, comprising:
    tagging the input text;
    performing a text processing operation to reformat the tagged input text, comprising:
        (a) searching the tagged input text to identify at least one defined combination or condition, wherein each combination or condition is associated with at least one action, and
        (b) performing at least one action, which is associated with each identified combination or condition, to the input text;
    performing the text processing steps until the processed text matches a template; and
    generating at least one homogeneous text segment.

5. A computer-implemented method for generating a report from survey data, comprising:
    analyzing the survey data using a computer;
    generating, using a computer, at least one homogenous text segment that can be automatically processed, wherein the at least one text segment matches a template;
    processing the at least one text segment using a computer; and
    generating a report, using a computer, of survey data.

6. A computer for communication with an electronic network, the computer comprising:
    means for tagging an input text;
    means for processing the tagged input text, comprising:
        (a) means for identifying at least one defined combination or condition in the tagged input text, wherein each combination or condition is associated with at least one action, and
        (b) means for performing at least one action, which is associated with each identified combination or condition, to the input text;
    means for performing the text processing steps until the processed text matches a text template; and
    means for generating at least one homogenous text segment that can be automatically processed;
    wherein the at least one homogenous text segment can be computer-processed to generate a report.

7. A system for text analysis, comprising:
    a computer;
    a tagging component accessible to the computer;
    a text processing component accessible to the computer, the text processing component operable to reformat the text to generate at least one homogeneous text segment that can be automatically processed, wherein the at least one text segment matches a template; and
    an information deriving component accessible to the computer.

8. The system of claim 7, further comprising at least one database accessible to the computer.

9. A method for computerized text analysis, comprising:
    tagging a text;
    searching the tagged text to identify at least one defined combination or condition, wherein each combination or condition is associated with at least one action;
    performing a text processing operation on the tagged input text, the operation comprising one or more actions, associated with each identified combination or condition, selected from the group consisting of:
        performing a first text splitting step,
        reducing the number of words in the text,
        processing an idiomatic expression in the text,
        performing a first unnecessary word deletion step,
        performing a first word re-tagging step,
        splitting the text at a connective word,
        performing a first word combining step,
        marking prepositional phrases in the text,
        performing a second text splitting step,
        performing a second unnecessary word deletion step,
        performing a second word combining step,
        performing a second word re-tagging step, and
        performing at least one simplification step; and
    performing the searching and processing steps until the processed text matches a text template; and generating a homogoneous text segment.

10. The method of claim 9 further comprising preparing the text before the text processing operation is performed.

11. The method of claim 10, wherein preparing the text comprises one or more actions selected from the group consisting of:
    checking spelling,
    adding punctuation marks, replacing punctuation marks, marking the ends of sentences and paragraphs, and conforming the spacing between words, sentences and paragraphs.

12. A method for computerized text analysis, comprising:

tagging a text;

searching the tagged text to identify at least one defined combination or condition, wherein each combination or condition is associated with at least one action;

performing a text processing operation on the tagged input text, the operation comprising one or more actions, associated with each identified combination or condition, selected from the group consisting of:

performing a first text splitting step, performing a first word re-tagging step, splitting the text at a connective word, performing a first word combining step, marking prepositional phrases in the text, performing a second text splitting step, performing a second word combining step, moving elements into tags, rearranging word order; and performing the searching and processing steps until the processed text matches a template; and generating a homogeneous text segment.

13. The method of claim 12, wherein the group of actions further includes manipulating referencing words.

14. The method of claim 12, wherein the group of actions further includes processing an idiomatic expression in the text.

15. The method of claim 12, wherein the group of actions further includes:

reducing the number of words in the text, and performing a first unnecessary word deletion step.

16. The method of claim 15, wherein the group of actions further includes performing a second unnecessary word deletion step.

17. The method of claim 12, wherein the group of actions further includes performing a second word re-tagging step.

18. The method of claim 12, further comprising preparing the text before the text processing operation is performed.

* * * * *